UNITED STATES PATENT OFFICE.

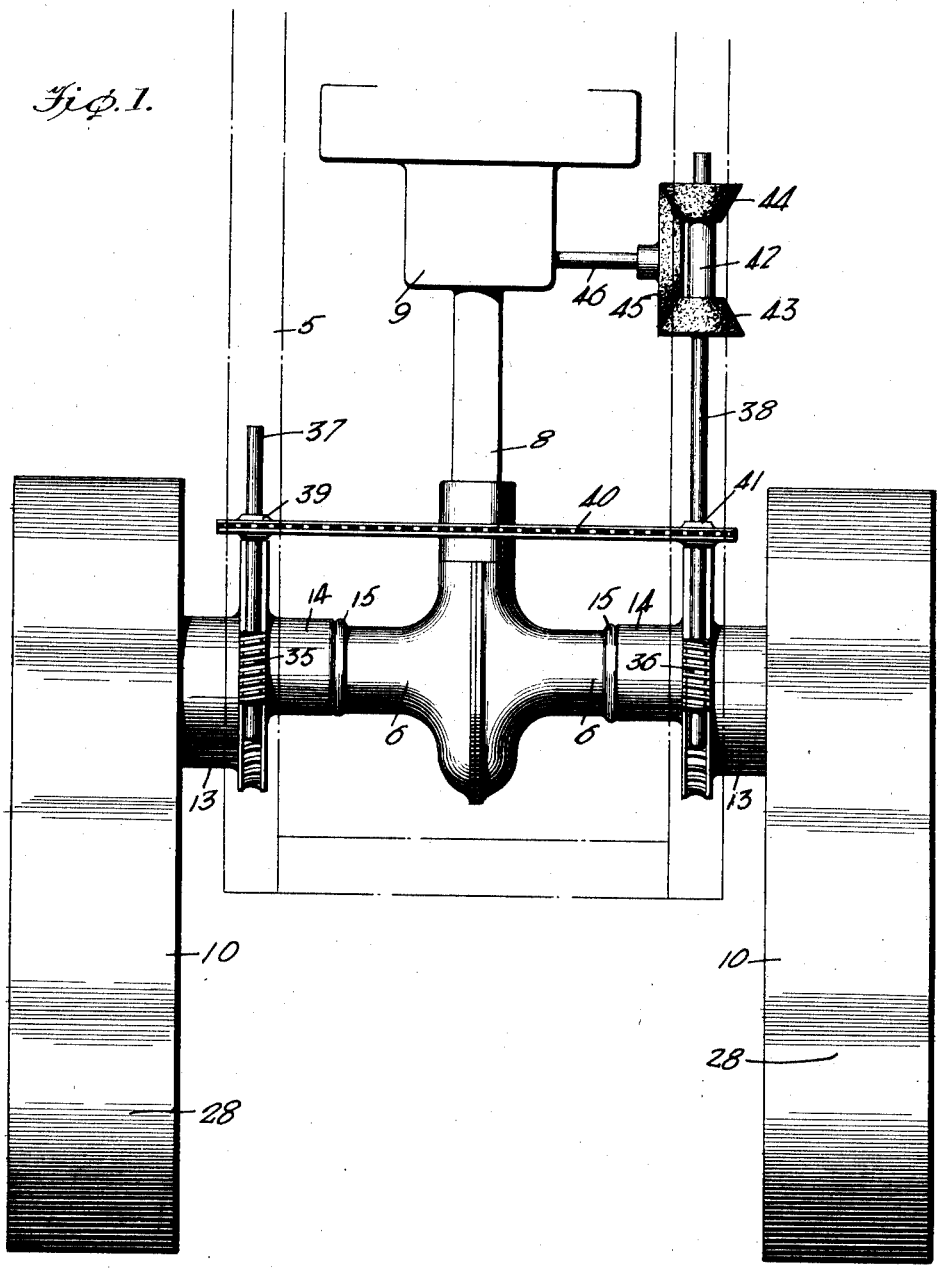

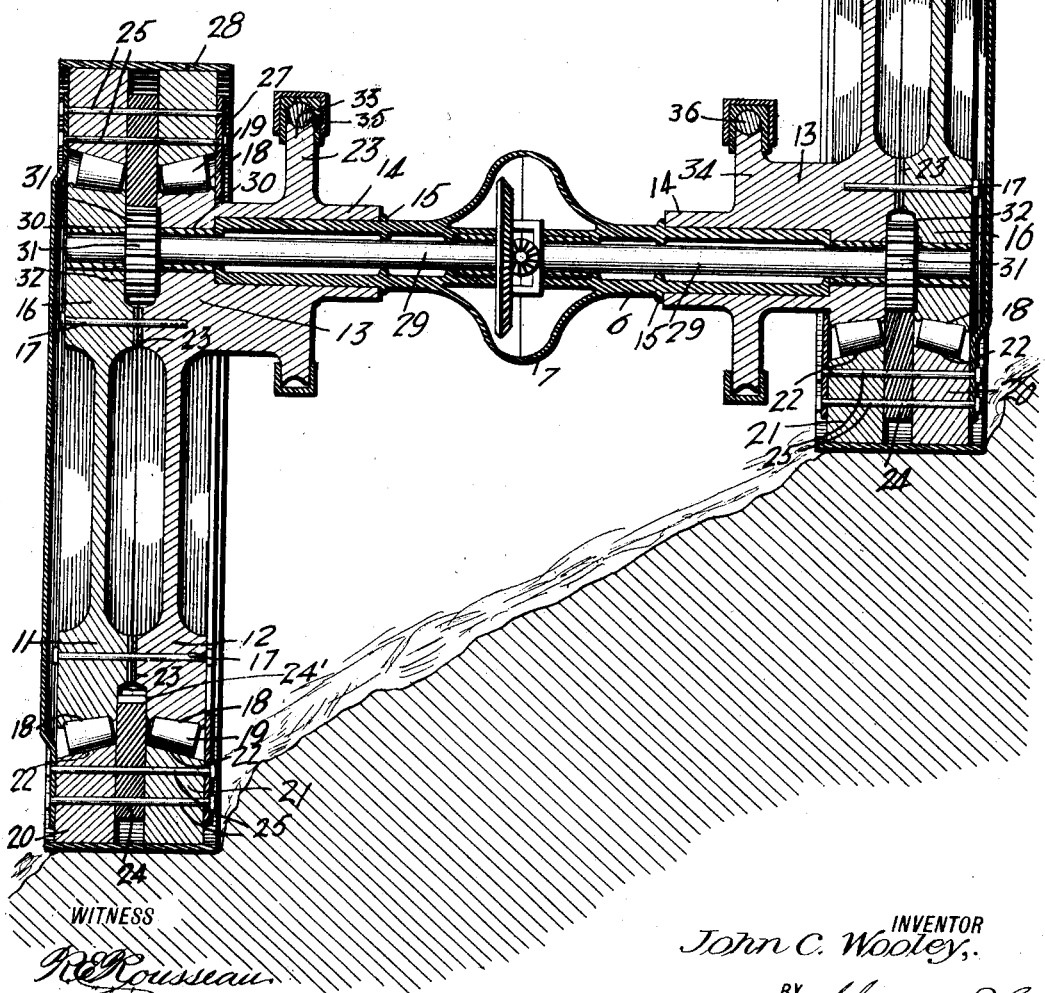
J. C. WOOLEY.
TRACTOR.
APPLICATION FILED AUG. 21, 1919.
1,385,417. Patented July 26, 1921.
3 SHEETS—SHEET 2.
INVENTOR
John C. Wooley,
BY
ATTORNEYS J. C. WOOLEY.
TRACTOR.
APPLICATION FILED AUG. 21, 1919.
1,385,417.
Patented July 26, 1921.
3 SHEETS—SHEET 3.
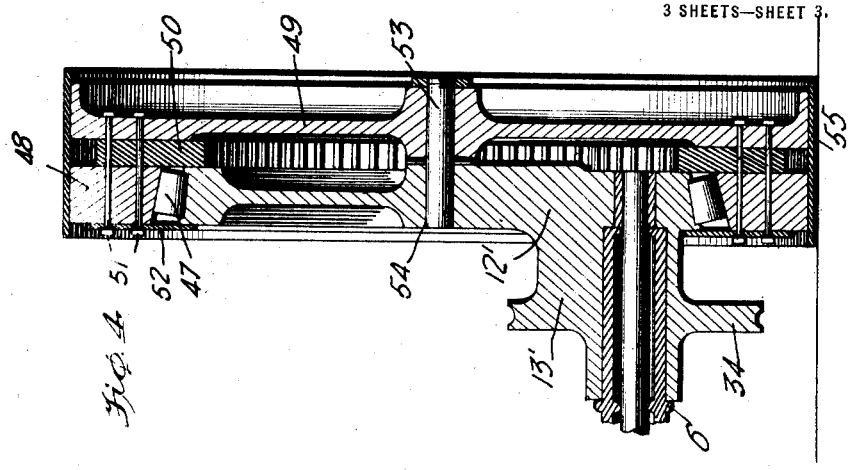
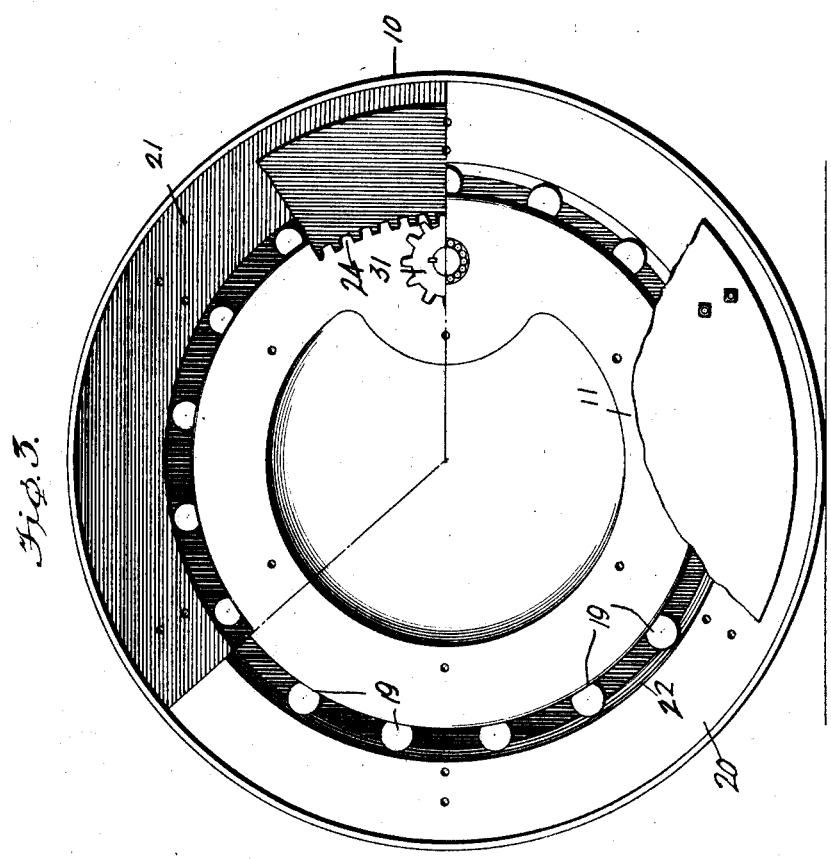
WITNESS
R. E. Rousseau.
INVENTOR
John C. Wooley,
BY
ATTORNEYS

JOHN COCHRANE WOOLEY, OF MOSCOW, IDAHO.

TRACTOR.

1,385,417.   Specification of Letters Patent.   Patented July 26, 1921.

Application filed August 21, 1919. Serial No. 319,016.

*To all whom it may concern:*

Be it known that I, JOHN C. WOOLEY, a citizen of the United States, residing at Moscow, in the county of Latah and State of Idaho, have invented new and useful Improvements in Tractors, of which the following is a specification.

My invention relates to tractors or self-propelled vehicles, and has particular reference to means for maintaining level the the frame of the tractor.

An important object of the invention is to provide means of the above mentioned character which are simple in construction, strong, durable, and reliable in operation.

Other objects and advantages of the invention will be apparent during the course of the following description.

In the accompanying drawings, forming a part of this specification, and in which like numerals are employed to designate like parts throughout the same, Figure 1 is a plan view of a tractor embodying my invention.

Fig. 2 is a central vertical transverse sectional view through the traction wheels and associated elements, parts being shown in elevation.

Fig. 3 is a side elevation of one traction wheel, parts being broken away, and parts in section in different planes, and, Fig. 4 is a transverse section through a slightly different form of traction wheel.

In the drawings, wherein for the purpose of illustration is shown a preferred embodiment of my invention, the numeral 5 designates the frame of the tractor, which is suitably mounted upon a relatively stationary rear axle casing 6, including the usual differential gear casing 7. This differential gear casing has connection with a tubular housing 8, extending to the transmission case 9, which is suitably secured upon the frame 5.

The numeral 10 designates traction wheels, as a whole, each of which consists of a pair of cylindrical eccentric bearing elements 11 and 12 preferably in the form of circular plates. The inner bearing element 12 is equipped with an eccentric tubular hub 13 provided with a hub-sleeve 14. This hub sleeve is rotatable upon the outer end of the axle casing 6 and engages the flange 15. The outer eccentric bearing element 11 has an eccentric tubular hub 16, the eccentric bearing elements 11 and 12 being secured together by bolts 17 or the like.

The bearing elements 11 and 12 are provided upon their peripheries with transversely inclined faces, which converge inwardly, and these faces are provided at spaced intervals with recesses 18, to receive rollers or bearing members 19, which are preferably tapered and decrease in diameter inwardly.

Each traction wheel further comprises an annular tread member, comprising a pair of rings 20 and 21, having inner inclined faces 22, to engage with the rollers 19. Arranged between the contacting faces of the eccentric bearing elements 11 and 12 are shims 23, and certain of these shims may be removed so that the elements 11 and 12 may be brought closer together, to compensate for wear upon the tapered rollers 19. An annular gear 24 is arranged between the rings 20 and 21, and these elements are all securely held together by bolts 25. This annular gear extends into an annular recess 24'. A protecting plate covers the outer side of the traction wheel, and a protecting ring 27 is secured to its inner side, these rings being also held in place by the bolts 25. A tire 28 is suitably secured to the peripheries of the rings 20 and 21.

A differential gearing is arranged within the casing 7, and serves to drive axle sections 29, which extend through the casing 6 into bearings 30, arranged within the hubs 13 and 16. The axle sections 29 carry gears 31, disposed within recesses 32, and engaging the annular gears 24, to drive the same, as shown. The gears 31 are rigidly secured upon the axle sections 29 and serve to prevent the longitudinal displacement of the traction wheels upon these axle sections. The differential gearing is driven by the engine, in the usual manner, and drives the axle sections 29.

Means are provided to turn the eccentric bearing elements 11 and 12 of the two traction wheels, in opposite directions, for maintaining the frame of the tractor level, when the same is traveling upon an incline, or upon a hillside. Such means comprises a right-hand worm wheel 33, rigidly secured to the hub 13 to the left, and a left-hand worm wheel 34, rigidly secured to the hub 13 to the right. The right-hand worm wheel 33 receives its rotation from a right hand worm 35, and the left-hand worm wheel 34 is driven by a left-hand worm 36. The worms 35 and 36 are formed upon longitudinal shafts 37 and 38, which are suitably supported upon the frame 5. The shaft 37 is equipped with a sprocket wheel 39, engaging a sprocket chain 40, extending to the right to engage a sprocket wheel 41, rigidly secured to the shaft 38.

The shaft 38 may be driven in opposite directions by a friction gear, comprising a sleeve 42, keyed to the shaft 38 to move longitudinally thereof and rotate therewith. This sleeve has friction gears 43 and 44 rigidly secured to the shaft thereof. The sleeve 42 may be shifted longitudinally in either direction by any suitable means, to alternately bring either gear 43 or 44 into engagement with the gear 45. This gear 45 is driven by a shaft 46, extending into the transmission case 9 for suitable connection with the crank shaft of the engine.

In view of the foregoing description it will be seen that the axle sections 29 will impart their rotation to the annular tread portions of the traction wheels, and that during this operation the eccentric bearing elements 11 and 12 of the traction wheels may be turned upon their pivots, for maintaining the frame of the tractor horizontal, as the same travels over inclined ground or a hillside.

In Fig. 4, I have shown a simplified form of traction wheel consisting of the inner eccentric bearing element 12' provided upon its periphery with recesses for receiving the tapered rollers 47, engaging a ring 48. The numeral 49 designates an outer wheel, and an annular gear 50 is arranged between this wheel and the ring 48, these parts being held together by bolts 51. A protecting plate 52 covers the rollers 47 and is held in place by the bolts 51. The wheel 49 is pivoted upon a stub shaft 53, held within a central opening 54 formed in the bearing element 12'. A rim 55 is secured to the tread portions of the elements 48 and 49. The element 12' has a hub 13', rotatable upon the axle sections 6, having a worm wheel 34, for turning the same, as described in connection with the first form of the invention. It is not thought that a further explanation of this form of the device is necessary.

Particular attention is called to the fact that the construction of the apparatus is such that the weight upon the two sides of the machine or tractor are equalized, when the machine is traveling upon a grade, thus affording equal traction to the traction wheels.

It is to be understood that the forms of my invention herewith shown and described are to be taken as preferred examples of the same, and that various changes in the shape, size, and arrangement of parts may be resorted to without departing from the spirit of my invention, or the scope of the subjoined claims.

Having thus described my invention, I claim:

1. In a tractor of the character described, an axle casing to be secured to the frame of the tractor, eccentric bearings arranged at the ends of the axle casing, each eccentric bearing including an outer eccentric bearing element and an inner eccentric bearing element having eccentric hubs pivoted upon the end of the axle casing, said hubs having a recess formed therein, said inner and outer eccentric bearing elements being provided at their peripheries with inclined faces, shims arranged between the contacting sides of the inner and outer eccentric bearing elements, adjustable means connecting the inner and outer eccentric bearing elements, an annular tread member arranged about the inner and outer eccentric bearing elements and having inner inclined faces and an annular gear arranged between the faces, tapered rollers engaging the inclined faces of the eccentric bearing elements and the inclined faces of the annular tread member, a gear arranged within the recess of each pair of inner and outer eccentric bearing elements and engaging the annular gear, means to turn the last named gear, and means to turn each pair of inner and outer eccentric bearing elements upon their pivot.

2. In a tractor of the character described, an axle casing to be secured to the frame of the tractor, eccentric bearings arranged at the ends of the axle casing, each eccentric bearing including an outer eccentric bearing element and an inner eccentric bearing element having eccentric hubs pivoted upon one end of the axle casing, said hubs having a recess formed therein, said inner and outer eccentric bearing elements being provided near their peripheries with an annular groove arranged between the same and having at their peripheries inclined faces, shims arranged between the contacting sides of the inner and outer eccentric bearing elements, adjustable means connecting the inner and outer eccentric bearing elements, an annular tread member arranged about the inner and outer bearing elements including a pair of rings having inner inclined faces, an annular gear arranged between the rings and projecting into the annular groove, means for connecting the rings and the annular gear, tapered rollers arranged upon opposite sides of the annular gear and engaging the inclined faces, a gear arranged within said recess and engaging the annular gear, means to rotate the last named gear, and means to turn each eccentric bearing upon its pivot.

3. In a tractor of the character described, an axle casing to be secured to the frame of the tractor, eccentric bearings arranged at the ends of the axle casing, each eccentric bearing including an outer eccentric bearing element and an inner eccentric bearing element having eccentric hubs pivoted upon one end of the axle casing, said hubs having a recess formed therein and arranged between the same, said inner and outer eccentric bearing elements being provided near their peripheries with an annular groove arranged between the same, means connecting the inner and outer eccentric bearing elements, an annular tread member arranged about the inner and outer bearing elements including a pair of rings, an annular gear arranged between the rings and projecting into the annular groove, and means for connecting the rings and the annular gear, bearing elements arranged between the inner faces of the rings and the outer faces of the inner and outer eccentric bearing elements, a gear arranged within said recess and engaging the annular gear, means to rotate the last named gear, and means to turn each eccentric bearing upon its pivot.

4. In a tractor of the character described, an axle casing secured to the frame of the tractor, circular bearing plates having eccentric hubs rotatably mounted at each end of said axle casing and having provided at their peripheries an annular groove disposed between the same, an annular tread member rotatably mounted on the periphery of said bearing plates, an annular gear carried by the tread member and projecting into said groove, means including a gear engaging said annular gear for driving said tread member, and means for turning said eccentric bearing plates.

5. In a tractor of the character described, an axle casing secured to the frame of the tractor, circular bearing plates having eccentric hubs rotatably mounted at each end of said axle casing, said bearing plates having their faces at their peripheries inclined, an annular tread member rotatably mounted on the periphery of each of said bearing plates and having its inner face inclined, bearings disposed between and engaging with the inclined peripheral face of said bearing plates and the inner inclined face of said tread member, means for driving said tread member and means to turn said eccentric bearing plates.

6. In a tractor of the character described, an axle casing secured to the frame of the tractor, circular bearing plates having eccentric hubs rotatably mounted at each end of said axle casing, an annular tread member rotatably mounted on the periphery of each of said bearing plates, bearings disposed between and engaging with the periphery of said bearing plates and the inner face of said tread member, means for driving said tread member, and means to turn said eccentric bearing plates.

JOHN COCHRANE WOOLEY.